UNITED STATES PATENT OFFICE.

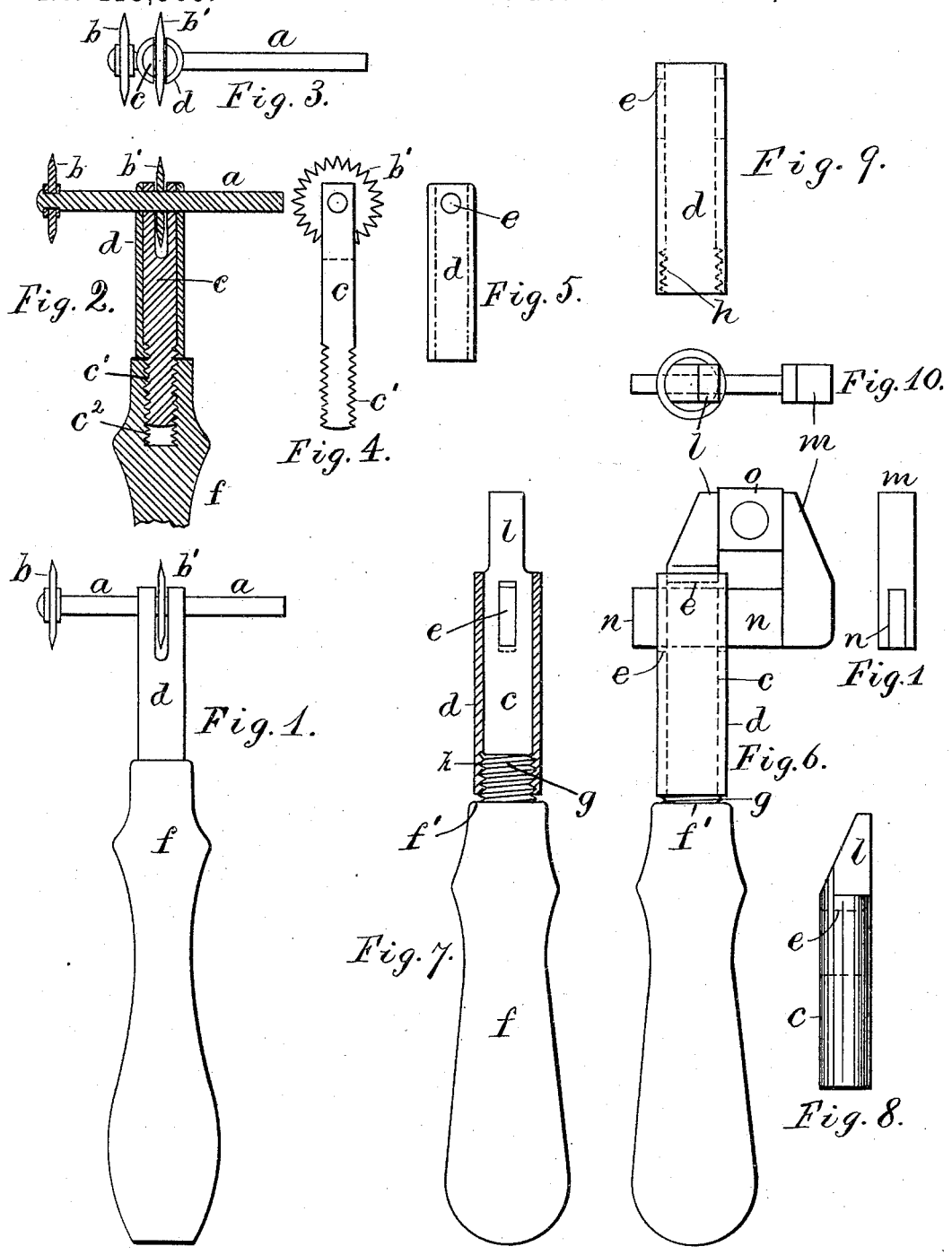

GEORGE F. HALL, OF NEWARK, NEW JERSEY.

TOOL-CLAMP.

SPECIFICATION forming part of Letters Patent No. 415,969, dated November 26, 1889.

Application filed August 16, 1889. Serial No. 320,983. (No model.)

*To all whom it may concern:*

Be it known that I, GEORGE F. HALL, a citizen of the United States, residing at Newark, Essex county, New Jersey, have invented certain new and useful Improvements in Tool-Clamps, fully described and represented in the following specification and the accompanying drawings, forming a part of the same.

This invention consists in an improved clamp for such tools as have one part adjustable toward another, the clamp forming the means of holding such parts securely in the proper relation to one another when adjusted.

The invention is shown herein applied to a pattern-marker and to a wrench, and is capable of other applications.

In the drawings, Figure 1 represents a pattern-marker having two pricking-wheels adjusted about an inch apart. Fig. 2 is a central section of the same, except the lower half of the handle. Fig. 3 is a plan of the same without the handle with the pricking-wheels set close together. Fig. 4 is a side view of the clamping-stem with one of the pricking-wheels held therein, and Fig. 5 a side view of the clamping-sleeve. Fig. 6 is a side view of a wrench constructed with my improvement; Fig. 7, an edge view of the same with the sleeve in section; Fig. 8, a side view of the stem; Fig. 9, a side view of the sleeve; Fig. 10, a plan of the jaws with the attached sleeve, and Fig. 11 an inside view of the movable jaw.

In Figs. 1 to 5 the pattern-marker is shown provided with two pricking-wheels adjustable toward one another. The adjustable element is the spindle $a$, carrying one pricking-wheel $b$ upon its outer end. The spindle passes through holes $e$, formed near the ends of a stem $c$ and sleeve $d$, and the latter parts are slotted adjacent to the holes to receive a pricking-wheel $b'$. The stem fits movably within the sleeve and is formed with a screw-thread $c'$, fitted to a threaded socket $c^2$ within the end of the handle $f$. The lower end of the sleeve is in contact with the upper end of the handle, and the spindle holds the holes $e$ in the stem and sleeve coincident, so that any longitudinal thrust upon the sleeve or stem will operate to jam the spindle against one side of the holes $e$, and thus clamp the spindle tightly. Such jamming is readily effected by turning the handle upon the thread $c'$, and thus forcing the handle against the lower end of the sleeve $d$, which pushes the sleeve toward the spindle $a$ and jams the spindle outward in the holes of the stem $c$. To adjust the spindle, the handle is turned to screw it a little off from the lower end of the sleeve. The spindle is thus released from the clamping-pressure, and is moved in or out, as desired, (being shown pushed inward in Fig. 3,) and the handle is then turned to jam the sleeve against the spindle and clamp it in the adjusted position.

In Figs. 6 to 11 the movement of the parts for clamping the adjustable element is reversed, a screw-thread being formed in the lower end of the sleeve, and a screw-plug affixed to the handle is employed to press the stem upward instead of the sleeve, as in the construction above described. The stem is projected beyond the end of the sleeve and provided with a jaw $l$, to form a wrench in conjunction with an opposed jaw $m$, which is fixed upon a transverse bar $n$, inserted through the stem and sleeve. A nut $o$ is shown between the jaws, and the bar $n$ is made of flat rectangular section, as shown in Fig. 11, to give it the necessary stiffness, and the holes $e$ through the stem and sleeve are made rectangular to fit such bar, as shown in Fig. 7. The handle $f$ is formed with a projecting screw-plug $g$, fitted to a thread $h$ in the lower end of the sleeve, and the lower end of the stem $c$ is formed to touch the plug $g$ when the lower end of the sleeve is clear from the shoulder $f'$ at the upper end of the handle. With this construction the bar $n$, carrying the wrench-jaw $m$, is loosened for adjustment by turning the screw-plug $g$ outward from the sleeve, and the bar is clamped (when adjusted) within the holes $e$ by screwing the stud $g$ against the lower end of the stem, and thus pushing the bar forcibly against the outer ends of the holes in the sleeve. The position of the parts in clamping is shown in Figs. 6 and 7, with the under side of the hole in the stem in contact with the bar $n$ and the bar pressed into contact with the upper sides of the holes in the sleeve.

From the above description it will be seen that the essential part of the invention consists in the sleeve and stem perforated adjacent to one another, with holes adapted to receive a transverse bar and carried by a handle having a screw-thread for pressing the stem or sleeve longitudinally to clamp the bar within the holes. The sleeve is actuated by the handle, whether the latter be pressed against its lower end, as in Fig. 2, or screwed within the same, as in Fig. 7, and it is therefore immaterial whether the screw-thread be formed inside or outside of the handle, one construction being shown in Fig. 2 in the threaded socket $c^3$ and the other construction in Fig. 7 in the stud $g$. The handle in both cases serves equally to carry the stem and sleeve, and its screw-thread operates equally to actuate the clamp with either construction.

Having thus set forth my invention, what I claim is—

1. The combination, with the handle, of a stem and sleeve carried by the same, the holes $e$ through the stem and sleeve, adjacent to one another, a cross-bar fitted in such holes and carrying an adjustable portion of the tool, and the handle having a screw-thread adapted, when the handle is turned in relation to the cross-bar, to move the stem and sleeve in relation to one another, and thus clamp the cross-bar, substantially as herein set forth.

2. The combination, with the handle, of a stem and sleeve carried by the same, the holes $e$ through the stem and sleeve, adjacent to one another, a wrench-jaw formed upon the outer end of the stem, the cross-bar $n$, movable in the holes and provided at its outer end with the jaw $m$, and the handle provided with a screw-thread to actuate the sleeve, as and for the purpose set forth.

In testimony whereof I have hereunto set my hand in the presence of two subscribing witnesses.

GEORGE F. HALL.

Witnesses:
THOS. S. CRANE,
FRED. C. FISCHER.